United States Patent [19]

Beckey et al.

[11] Patent Number: 4,702,413
[45] Date of Patent: Oct. 27, 1987

[54] TEMPERATURE CONTROL SYSTEM USING A SINGLE RAMP RATE CURVE FOR CONTROL OF A MULTIPLANT ENVIRONMENTAL UNIT

[75] Inventors: Thomas J. Beckey, Edina; Kerry M. Kallas, Minneapolis; Daniel T. Uhrich, Mayer, all of Minn.

[73] Assignee: Honeywell Inc., Minneapolis, Minn.

[21] Appl. No.: 46,766

[22] Filed: May 7, 1987

[51] Int. Cl.⁴ ............................................. F25B 29/00
[52] U.S. Cl. .................................... 236/46 R; 165/29
[58] Field of Search ............. 236/46 R, 78 D; 165/12, 165/29; 62/231; 364/557, 505; 307/39

[56] References Cited

U.S. PATENT DOCUMENTS

| | | | |
|---|---|---|---|
| 4,172,555 | 10/1979 | Levine | 236/46 R |
| 4,334,576 | 6/1982 | Fuchek | 165/12 |
| 4,387,763 | 6/1983 | Benton | 165/29 |
| 4,442,972 | 4/1984 | Sahay et al. | 236/1 EA |
| 4,655,279 | 4/1987 | Harmon, Jr. | 165/12 X |
| 4,674,027 | 6/1987 | Beckey | 165/12 X |

Primary Examiner—William E. Wayner
Attorney, Agent, or Firm—Alfred N. Feldman

[57] ABSTRACT

A temperature control system for a multiplant environmental unit such as a heat pump with auxiliary heat is disclosed. The control system utilizes a thermostat having a microprocessor and memory that allows for energy savings through setback functions. The setback functions return the temperature control from a setback temperature to a normal comfort temperature along a ramped rate that is modified from day to day. The purpose of this variable ramp is to minimize the operation of the auxliary heat and maximize shell savings (by starting as late as possible). This is basically accomplished by locking the heat pump on in certain cases.

10 Claims, 7 Drawing Figures

TEMPERATURE CONTROL SYSTEM USING A SINGLE RAMP RATE CURVE FOR CONTROL OF A MULTIPLANT ENVIRONMENTAL UNIT

CROSS-REFERENCE TO RELATED APPLICATION

The present application is related to application serial number 06/031,952, entitled "Temperature Control System For Control Of A Multiplant Environmental Unit" which was filed on Mar. 30, 1987, and which is assigned to the assignee of the present invention.

BACKGROUND OF THE INVENTION

The optimum control of heating and cooling of enclosed spaces, such as residential structures, has become a highly developed art. This art has been refined by the control of the temperature in such structures by the means of real time operated thermostats that utilize microcomputers or microprocessors that have extensive memories. With the use of microcomputers and memories, it is possible to build a thermostat that is capable of accurate control and one that is capable of generating substantial energy savings. The energy savings are accomplished in the heating mode by the thermostat setting back the building temperature at night or when the building is not occupied, and then returning the temperature setting to a normal temperature at a preselected time. Energy can also be saved in a cooling mode by setting the building temperature up during an unoccupied time, and then returning the temperature setting to a lower temperature for normal occupation of the building.

These changes save energy by lowering the need for energy consumption when a building is not occupied, or when the occupants can tolerate the variation from a normal temperature. These functions have been long recognized and utilized with various types of clock-operated thermostats. Technology has progressed to the point where prior temperature cycles for the building are stored in the microcomputer's memory for use in controlling the future temperature cycles within the building. This type of control, while being generally energy efficient, has a serious flaw when the heating and/or cooling source is a heat pump that utilizes auxiliary heat. Typically, a heat pump will have a very good cost efficiency, and the auxiliary electric heat will have a relatively poor cost efficiency. Any type of auxiliary heat could be used in place of electric heat. In present day equipment that uses setback for energy savings with heat pumps, the heat pump and electric auxiliary heat both come on during the pick up cycle. This may be inefficient from an energy standpoint as the heat pump alone might be capable of bringing the building back to a normal temperature in a reasonable period of time without the use of auxiliary heat. This function has been recognized, and outdoor sensors are sometimes incorporated in these systems. When an outdoor sensor is used, the outdoor temperature at which auxiliary heat is enabled is arbitrarily selected which may result in less than efficient use of the auxiliary electric heat. In order to obtain maximum house shell savings and system efficiency, a heat pump with auxiliary heat must be operated with a judicious use of the auxiliary heat.

In the cross-referenced application, a system for control that utilizes a pair of ramp rates was disclosed. The pair of ramp rates were used generally for control of the heat pump separate from the auxiliary electric heat. The implementation of the dual ramp concept requires that the memory capabilities used with the microcomputer be substantially larger than may be desired.

SUMMARY OF THE INVENTION

The present invention is directed to a temperature control system for a multiplant environmental unit wherein a microcomputer or microprocessor based thermostat is utilized. The invention has particular utility with heat pumps that are operated in conjunction with auxiliary electric heat. The electric heat typically provides a very high cost penalty in its use over the heat pump itself. The present system or invention is utilized in a setback type of thermostat wherein a lowered temperature during a night or unoccupied period is utilized for energy savings, and then the temperature is setup to a normal comfort temperature. The setup function is controlled by the present invention in a manner that provides a high degree of efficiency in the use of the heat pump and auxiliary heat, as well as providing a good response of the control temperature between the setback temperature level and the desired comfort temperature level.

In the present invention, the temperature controlled system has a single mode of operation and utilizes but one ramp rate. The single ramp is adjusted between a minimum, which is enforced to ensure a certain amount of setback savings, to a maximum which is enforced to ensure a minimum amount of time available for recovery. Also, in the present invention separate ramp rates can be stored in the memory of the thermostat means for use at different times of the day, for instance one ramp rate for a night setback function, and the second ramp rate for a daytime setback function when a home is unoccupied.

The single ramp rate of the present invention causes the operation of the heat pump and auxiliary heat in a different manner than has been accomplished in the past. Upon the intersection of the actual sensed temperature with the programmed ramp rate, the heat pump is turned on and is locked in an on state. In the event that the sensed temperature stays within the interstage differential of the thermostat means, the auxiliary heat is not used. In the event that the sensed temperature falls by a greater degree than the interstage differential for the thermostat means, the auxiliary heat is cycled. The recovery from a setback function is terminated either at the programmed time of day, or by the sensed temperature rising close to the normal comfort temperature for the building. In either event, the thermostat then resumes normal operation with the heat pump and auxiliary heat operating in a cycled fashion determined by the thermostat means.

The thermostat means, by way of the microcomputer and the memory, then determines whether the return to normal operation occurred before or after the programmed time for the normal comfort temperature. The slope of the ramp rate is adjusted for the next cycle to attempt to cause the actual measured temperature to intersect the desired comfort temperature at the end of the setback period.

In accordance with the present invention there is provided a temperature control system for control of a multiplant environmental unit for tempering the atmosphere in an enclosed space in an energy efficient manner, including: a multiplant environmental unit having at least a first output and a second output; said first output being more cost effective to operate than said second output; real time clock operated two stage thermostat means located in said space; said thermostat means including means to enter selected times and temperatures, and further including means to sense an ambient temperature in said space; said thermostat means having a selected comfort setpoint temperature, and further having a selected energy savings setback setpoint temperature to define limits of the operation of said multiplant environmental unit over a temperature control cycle; said thermostat means including microcomputer means having memory means; said memory means storing a time versus temperature curve with said curve selected to utilize said first output, or both outputs simultaneously which causes said atmosphere to change from said energy savings setback setpoint temperature to said comfort setpoint temperature; a first stage of said thermostat means operating said multiplant environmental unit upon said sensor temperature intersecting said operating curve which then locks on said first output; a second stage of said thermostat means operating said second output; said thermostat means ending a recovery and shifting to said selected comfort setpoint temperature upon said sensor temperature reaching a specified value below said setpoint temperature, or upon the expiration of a setback time programmed in said memory means; and said memory means storing a time of said ending recovery and increasing or decreasing a ramprate of said time versus temperature curve for a next temperature control cycle depending on whether said end of recovery time occurred before said setback time.

Further in accordance with the present invention a real time clock operated two stage thermostat means for control of a multiplant environmental unit having at least a first output and a second output with said first output being more cost effective to operate than said second output for tempering the atmosphere in an enclosed space in an energy efficient manner, including: said thermostat means located in said space; said thermostat means including means to enter selected times and temperatures, and further including means to sense an ambient temperature in said space; said thermostat means having a selected comfort setpoint temperature, and further having a selected energy savings setback setpoint temperature to define limits of the operation of said multiplant environmental unit over a temperature control cycle; said thermostat means including microcomputer means having memory means; said memory means storing a time versus temperature curve with said curve selected to utilize said first output, or both outputs simultaneously which causes said atmosphere to change from said energy savings setback setpoint temperature to said comfort setpoint temperature; a first stage of said thermostat means operating said multiplant environmental unit upon said sensor temperature intersecting said operating curve which then locks on said first output; a second stage of said thermostat means operating said second output; said thermostat means ending a recovery and shifting to said selected comfort setpoint temperature upon said sensor temperature reaching a specified value below said setpoint temperature, or upon the expiration of a setback time programmed in said memory means; and said memory means storing a time of said end of recovery and increasing or decreasing a ramprate of said time versus temperature curve for a next temperature control cycle depending on whether said end of recovery time occurred before said setback time.

DESCRIPTION OF THE PREFERRED EMBODIMENT

Figure 1:
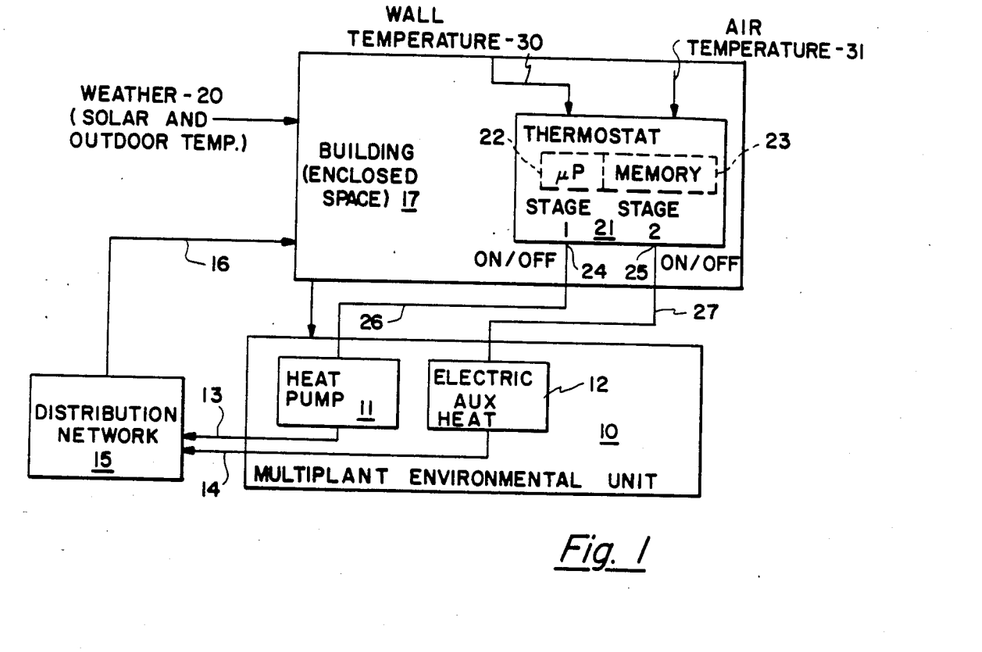
FIG. 1 is a block diagram of a building, and environmental unit for control and the distribution network.

In FIG. 1 a multiplant environmental unit 10 is disclosed made up of a heat pump 11 and electric auxiliary heat 12. The heat pump 11 and auxiliary heat 12 provide heat (and cooling on the reverse cycle) via channels 13 and 14 to a distribution network 15. The distribution network 15 includes such equipment as a blower and duct work, and provides heating and/or cooling through a channel 16 to a building or enclosed space 17. The building or enclosed space 17 could either be a residential or small commercial structure, and would be affected by weather 20. Weather 20 includes such things as solar radiation, winds, and outdoor temperature.

Within the building or enclosed space 17 is a real time clock operated thermostat means 21 that includes a microcomputer or microprocessor 22 and a memory 23. The thermostat means 21 also would include a clock means, which normally is part of the microprocessor or microcomputer 22. The thermostat means 21 is indicated as having at least two stages 24 and 25 that are capable of providing switched, on-off control signals to conductors 26 and 27 that are used to in turn control the heat pump 11 and the auxiliary electric heat 12. The thermostat means 21 is normally affected by the wall temperature 30 and the air temperature 31 of the building or enclosed space 17. To this point, a conventional heat pump and auxiliary heat arrangement for a building or residence incorporating the novel system has been described. The temperature control system or thermostat means 21 of FIG. 1 is adapted to the present invention in a manner that will be disclosed subsequently.

Very briefly, the operation of FIG. 1 includes the operation of the thermostat means 21 to control temperature between a night setback temperature, for instance 60 degrees Fahrenheit, and a normal daytime comfort temperature of, say 70 degrees Fahrenheit. The thermostat means 21 has two stages that can be controlled to provide the mode of operation that was discussed in the Background of the Invention. The heat pump 11 is controlled by the first stage of thermostat means 21, while the auxiliary electric heat 12 is controlled by the second stage of the thermostat means 21. The thermostat means 21 responds to the air temperature 31 and the wall temperature 30, while the enclosed building or space 17 is responsive to the outside weather 20 in combination with heat supplied through the distribution network 15 via the duct 16 in a conventional manner.

An important aspect of the present invention is the manner in which the heat pump 11 and the auxiliary electric heat 12 are operated by the thermostat means 21. This operation can best be explained and understood by considering FIGS. 2 through 5 wherein the of operation of the system will be described and explained.

FIGS. 2 through 5 disclose four graphs representing four different levels of operation of the temperature control system or thermostat means disclosed in FIG. 1. The temperature control system operates the multiplant environmental unit 10 with either the operation of the heat pump 11 or the operation of the heat pump 11 and the auxiliary heat 12. The graphs of FIGS. 2 through 5 plot temperature in degrees Fahrenheit at 36 versus time in hours at 35. The operation of the multiplant environmental unit 37 is also plotted against the time in hours 35, indicating whether the heat pump 11 is on or off, and whether the auxiliary heat 12 is on or off. In this way, the building temperature response to the outputs from the multiplant environmental unit 10 can be examined. The heat pump function is referred to as a first output, and the auxiliary heat as a second output. It is further understood that the thermostat means 21 of FIG. 1 has a sensor means or sensor temperature that allows the thermostat means 21 to track the temperature within the building or enclosed space 17. The real time clock that is contained within the thermostat 21 functions with the programming of the memory within the thermostat means 21 to provide the curves within FIGS. 2 through 5, and which now will be described in detail.

Figure 2:
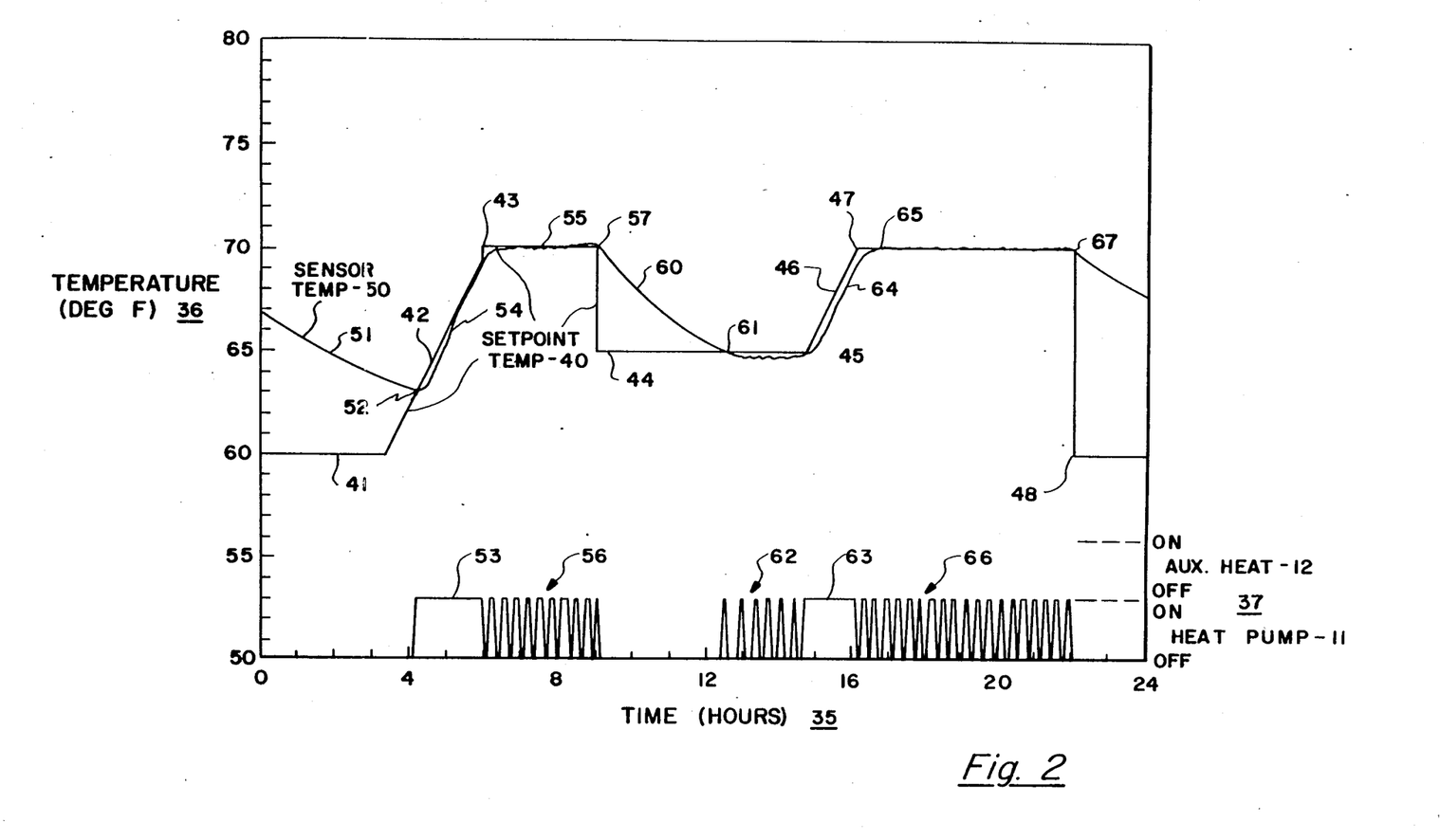
FIGS. 2 through 5 are graphs of the time versus temperature, and temperature control cycles for an environmental unit for the building.

The graph of FIG. 2 assumes a mild outdoor temperature, for instance, 50 degrees Fahrenheit. The graph assumes values of a ramp rate that reflects a previous similar day. A setpoint temperature curve 40 is disclosed with a night setback temperature of 60 degrees Fahrenheit shown at 41, and a sloped ramp rate 42 to a normal daytime comfort temperature at 43 which occurs at approximately 6 a.m. The setpoint temperature curve 40 has the ramp rate 42 established by the previous day's events, and this ramp rate slope is limited between a maximum and minimum range to enforce a certain amount of setback saving while also enforcing a minimum amount of time available for the recovery of the system.

The setpoint temperature curve 40 discloses a second setback at 44 at approximately 9 a.m. This setback is to 65 degrees Fahrenheit, and could be used when a building is unoccupied during the day. At 45, the setpoint temperature curve 40 is again intersected by a ramp rate slope 46 to a normal comfort temperature 47. This change occurs to raise the temperature in the enclosed space or building 17 to a normal temperature for evening occupation of the building. The setpoint temperature curve 40 is completed at 48 when a night setback occurs to 60 degrees Fahrenheit at approximately 10 p.m.

The setpoint temperature curve 40 that has been shown is typical of a residence where energy is saved at night by setback, and again is saved during the day by smaller setback when the residence is unoccupied. It is obvious that the setpoint temperature curve 40 will be followed to a certain degree by a sensor temperature 50. The sensor temperature 50 will be initially described as it occurs during the early morning hours. The sensor temperature 50 declines at 51 in the early morning hours, as the building has been at a higher temperature earlier in that day. The sensor temperature at 50 drifts down at 51 towards an intersection at 52 with the ramp rate slope 42. At the intersection 52, the heat pump 11 is switched on as indicated at 53 and is locked into operation. This locked on state is different than the normal operation of a heat pump since the sensor temperature 50 (at 54) is close to the setpoint temperature curve 40, as exemplified by the ramp 42. The heat pump 11 is kept in an energized state as shown at 53 even though the temperature differential may decrease below what would normally be needed to operate the heat pump.

At 43, the setpoint temperature 40 is close to the selected comfort temperature at the selected comfort time. At 43, the sensor temperature 50 is within the normal differential of the thermostat means 21, and the auxiliary heat is not brought into operation. At 55, the sensor temperature 50 can be seen as following the setpoint temperature 40 by cycling of the heat pump 11 as disclosed generally at 56. The cycling 56 keeps the sensor temperature 50 within the thermostat's normal differential.

At 57, a setback occurs to 65 degrees Fahrenheit, and the sensor temperature 50 drifts down at 60 until the sensor temperature 50 intersects at 61 the setpoint temperature 44. It will be noted that at this time the heat pump 11 is cycled as disclosed at 62 to maintain the sensor temperature 50. This is controlled by the differential within the thermostat 21.

At 45, the ramp slope 46 begins the pick up period to end the afternoon setback function. At this point, the heat pump 11, as disclosed at 63, is locked on and the sensor temperature 50 rises at 64 towards the normal comfort setpoint temperature indicated at 47. The cycling of the heat pump at 66 maintains the sensor temperature 50, and the desired 70 degree Fahrenheit setpoint temperature within the range designed into the thermostat means 21. At the setback time 48, the sensor temperature 50 begins to drift down again at 67 and becomes coincident with 51 at the left side of FIG. 1.

Based on the daily operation shown in FIG. 2, the ramp rate slopes 42 and 46 will be modified just after the programmed times 43 and 47. The new ramp rates are calculated so that the start of the next day's recovery will be delayed as long as possible so that the heat pump alone will bring the sensor temperature 51 close to (within a specified value of) the setpoint temperature 40 at programmed time 43. For the operation shown in FIG. 2, both ramp rate slopes will be increased since the sensor temperature was within its specified value at the programmed times 43 and 47. Note that the ramp rates are only modified if their value is less than or greater than the maximum and minimum ramp rate values, respectively. If the sensor temperature had not reached a value within a specified distance of the comfort temperature at one of the programmed times 43 or 47, the ramp rate slope for that recovery period would have been decreased if it was greater than the minimum ramp rate value. If auxiliary heat was used at all during a recovery period, the new ramp rate slope for that recovery period would also have been decreased, providing it was greater than the minimum ramp rate value. Note that each ramp rate slope is modified based only on the recovery period associated with it; therefore, the slope for the nighttime period may increase while the daytime period slope may decrease.

Figure 3:
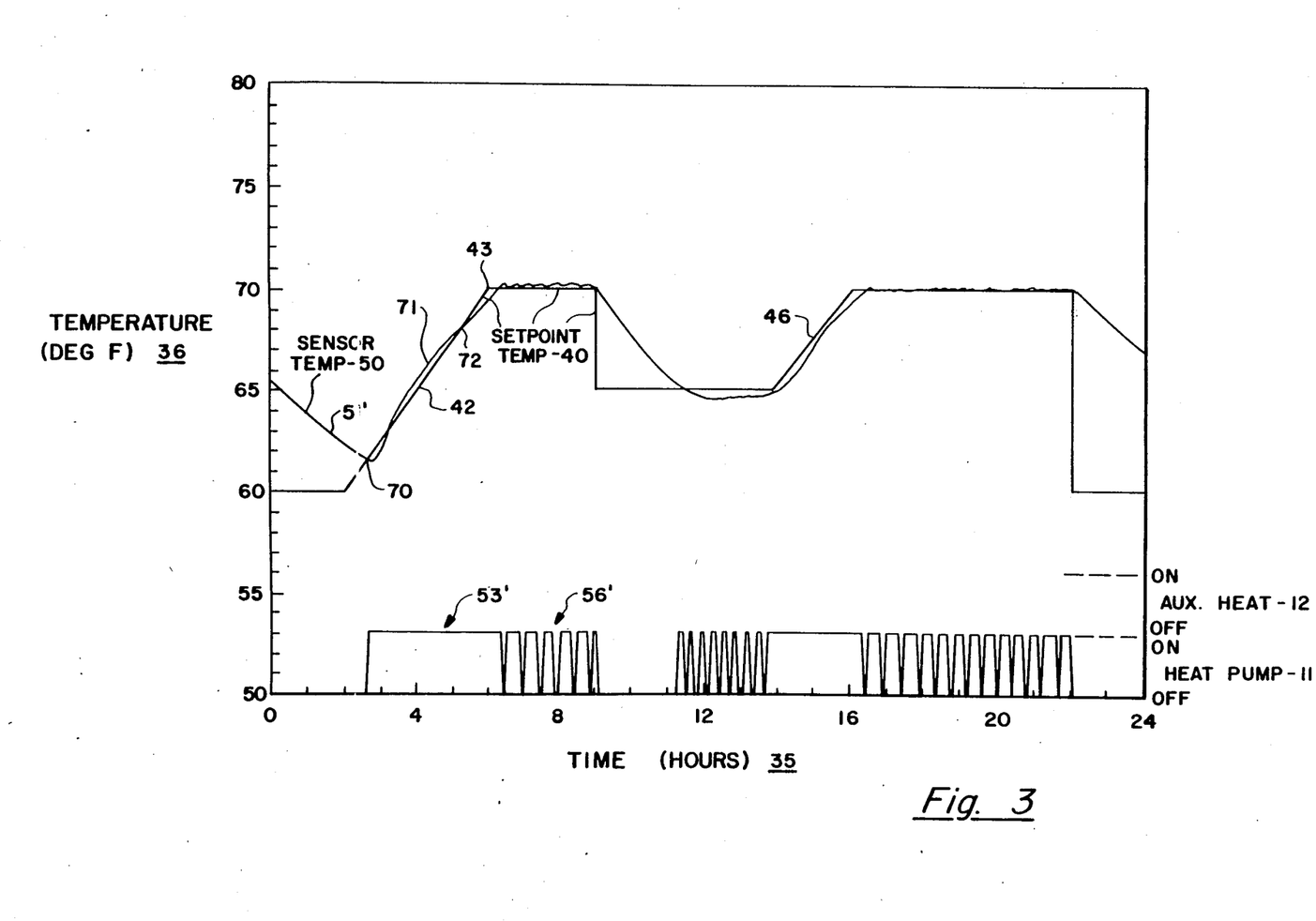

In FIG. 3, an environment approximately 10 degrees Fahrenheit colder is disclosed. It will be noted that the slope of the setpoint temperature 40 for ramp rates 42 and 46 are shallower than in FIG. 2, which means that the intersection of the sensor temperature 51′, as disclosed at 70, intersects the sloped ramp rate 42 at an earlier time of day. The heat pump 11 is locked on at 53′ at a much earlier time in the day. This occurs at approximately 2:30 a.m. Since the heat pump 11 is locked on at 53′, the sensor temperature rises at 71 above the ramp rate slope 42, but does not cause the heat pump 11 to be deenergized. The heat pump is continuously energized once it is brought into operation as indicated at 53'. The heat pump 11 remains locked on until either: (1) the sensor reaches a predetermined value below the normal comfort temperature of 70 degrees Farenheit, or (2) the actual time reaches the programmed time for the normal comfort temperature. In either case, the heat pump 11 may then be cycled as needed.

As the sensor temperature 50 approaches the normal comfort time 43 the sensor temperature 50 again intersects the ramp rate 42 at 72, but causes no change in operation of the heat pump 11 or auxiliary heat 12. In the situation disclosed in FIG. 3, the heat pump alone has managed to bring the sensor temperature close to the comfort setpoint at 43 before the programmed time and keeps it within the normal thermostat differential as indicated by the cycling of the heat pump at 56'. For this case both ramp rate slopes will be increased so as to delay the start of recovery and therefore increase the setback shell savings.

The afternoon setback function operates the same as the morning, and will not be again discussed. It will be apparent in considering FIG. 3, which is a colder day than FIG. 2, that the operation was still accomplished without the use of auxiliary heat.

Figure 4:
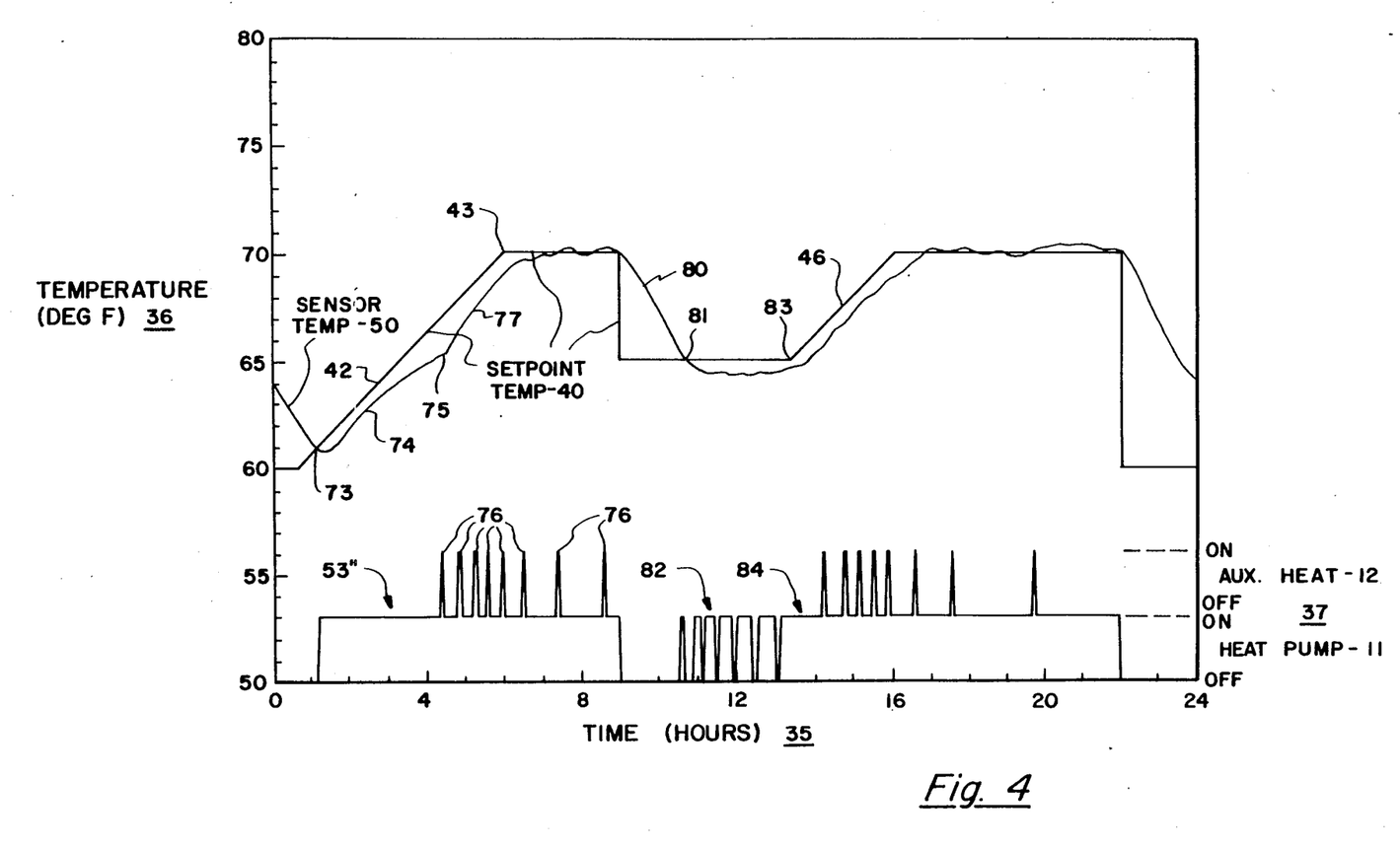

In FIG. 4 a still colder day of approximately 30 degrees Fahreheit is disclosed. The sensor temperature 50 is again shown drifting down to intersect the ramp rate 42, which in this case is shallower than in FIGS. 2 and 3. At an intersection of the sensor temperature 50, at 73 with the sloped ramp rate 42, the heat pump 11 is locked on at 53", as has occurred in the previous two examples. In this example, however, it will be noted that the sensor temperature 50, at 74, is drifting away or beneath the ramp rate 42 until it reaches a point 75. At 75 the difference between the sensor temperature 50 and the ramp rate 42 exceeds a predetermined differential within the thermostat means 11. At this point the auxiliary electric heat 12 is brought into operation as can be seen at 76. The electric heat 12 is cycled by the thermostat means 11 to bring the sensor temperature 50, at 77, back within the differential of the thermostat means 21 and the slope of the ramp rate 42. At the programmed time 43, the thermostat 21 updates the ramp rate slope and continues to operate both the first and second outputs in order to maintain the desired comfort setpoint. Since the auxiliary heat was required during the recovery period, the value of the ramp rate slope will be decreased, providing it is greater than the minimum ramp rate value. At 80 the sensor temperature 50 is shown drifting down, and intersects at 81 the setpoint temperature 40 during the day setback function. This causes the heat pump 11 to cycle, as disclosed at 82, to maintain the sensor temperature 50 within an acceptable range of the setpoint temperature 40 that is programmed into the thermostat means 21. At 83, the ramp rate 46 is again brought into play, and the heat pump 11 is locked on at 84 in the same fashion as has been previously discussed. The balance of the cycle is as previously noted and will not be again discussed.

Figure 5:
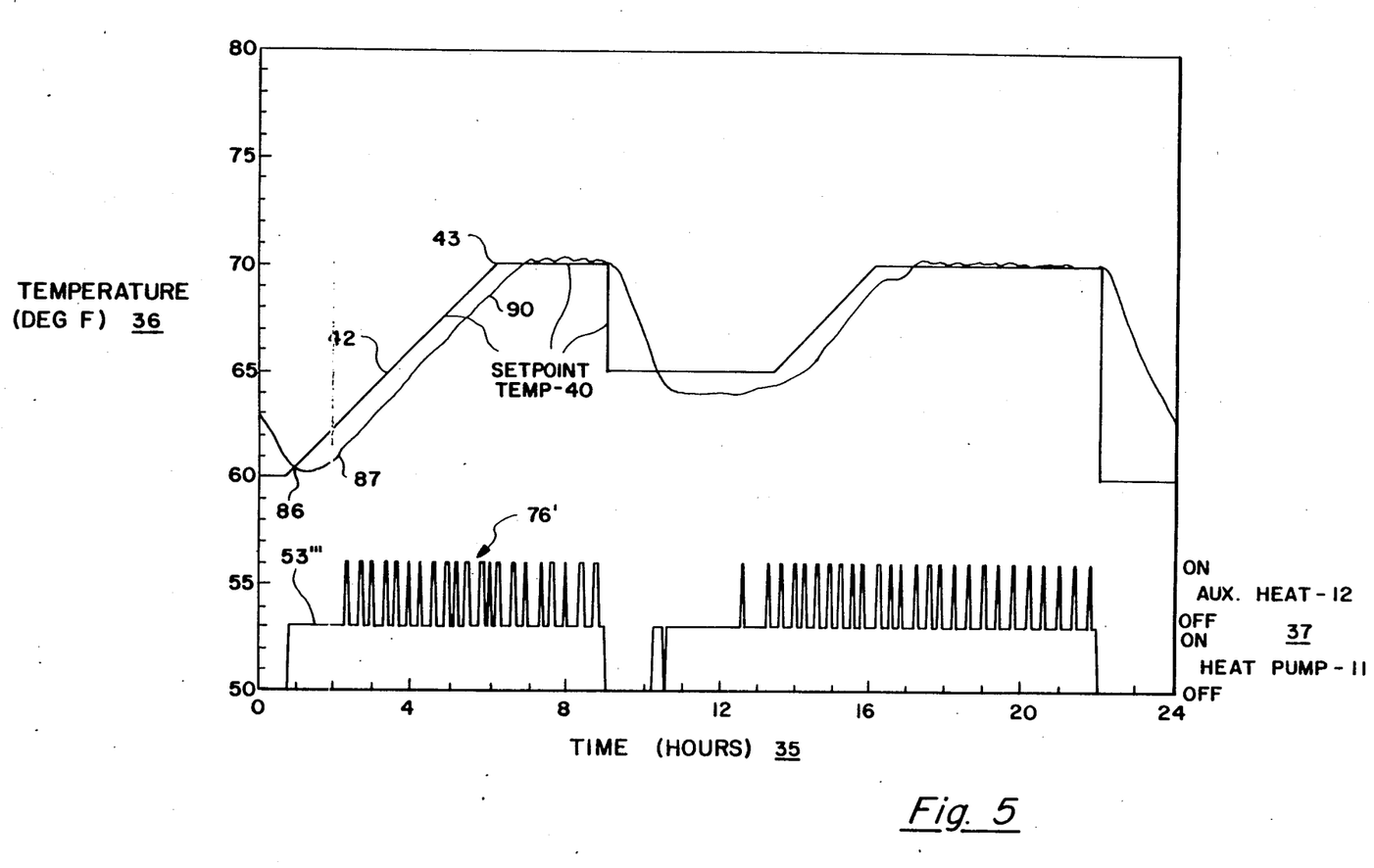

In FIG. 5, a still colder day, typically a day of 20 degrees Fahreheit is disclosed. The sensor temperature 50 drifts down at a rate determined by the heat loss of the building and intersects at 86 the ramp rate 42, which is approaching its minimum slope. It will be noted that the intersection of the ramp rate 42 and the setpoint temperature 50 at 86 again locks on the heat pump at 53'''. As the sensor temperature 50 drops to a low enough temperature at 87, the interstage differential of the thermostat means 21 comes into play and the auxiliary heat is cycled at 76'.

Because of the cold outdoor temperature, both the heat pump and auxiliary heat are needed to bring the temperature back to the comfort temperature 40. At the programmed time 43, the ramp rate slope is updated and the thermostat continues to operate both the heat pump and the auxiliary heat in order to maintain the desired comfort temperature. Again, the ram rate slope is decreased (subject to the minimum ramp rate condition) because the auxiliary heat was operating during the recovery from setback temperature. The ramp rate slope is also limited to predetermined minimum and maximum values, although its value is sure to be close to the minimum ramp rate allowed. The daytime setback is accomplished in the same manner and will not be described further.

The concept of the present invention is that in a heat pump with auxiliary heat type of installation, it is more desirable to use the heat pump than the auxiliary heat for cost saving purposes. With the present concept a single recovery ramp rate is used to initiate operation of the heat pump when that ramp rate is intersected by the sensor temperature during a pick up operation. The heat pump is locked into a continuously operating state. This operating state can cause the sensed temperature to rise in accordance with the preestablished ramp rate, can cause it to exceed that ramp rate, or can cause it to fall below the ramp rate. In the case that it follows or exceeds the ramp rate, only the heat pump is used. In the case where it falls below the ramp rate, the heat pump remains locked on while the auxiliary electric heat is cycled as needed to maintain a proper pick up operation. As soon as the space sensor temperature reaches a value near the comfort temperature, or the actual time is greater than the programmed comfort time, the recovery from setback is ended. The microprocessor within the thermostat means 21 changes the setpoint to the comfort temperature, and normal operation is begun. The ramp rate for the period is then increased or decreased depending on whether or not the recovery ended before the programmed setpoint change time. The value of the ramp rate is also limited to predetermined minimum and maximum values.

Figure 6A:
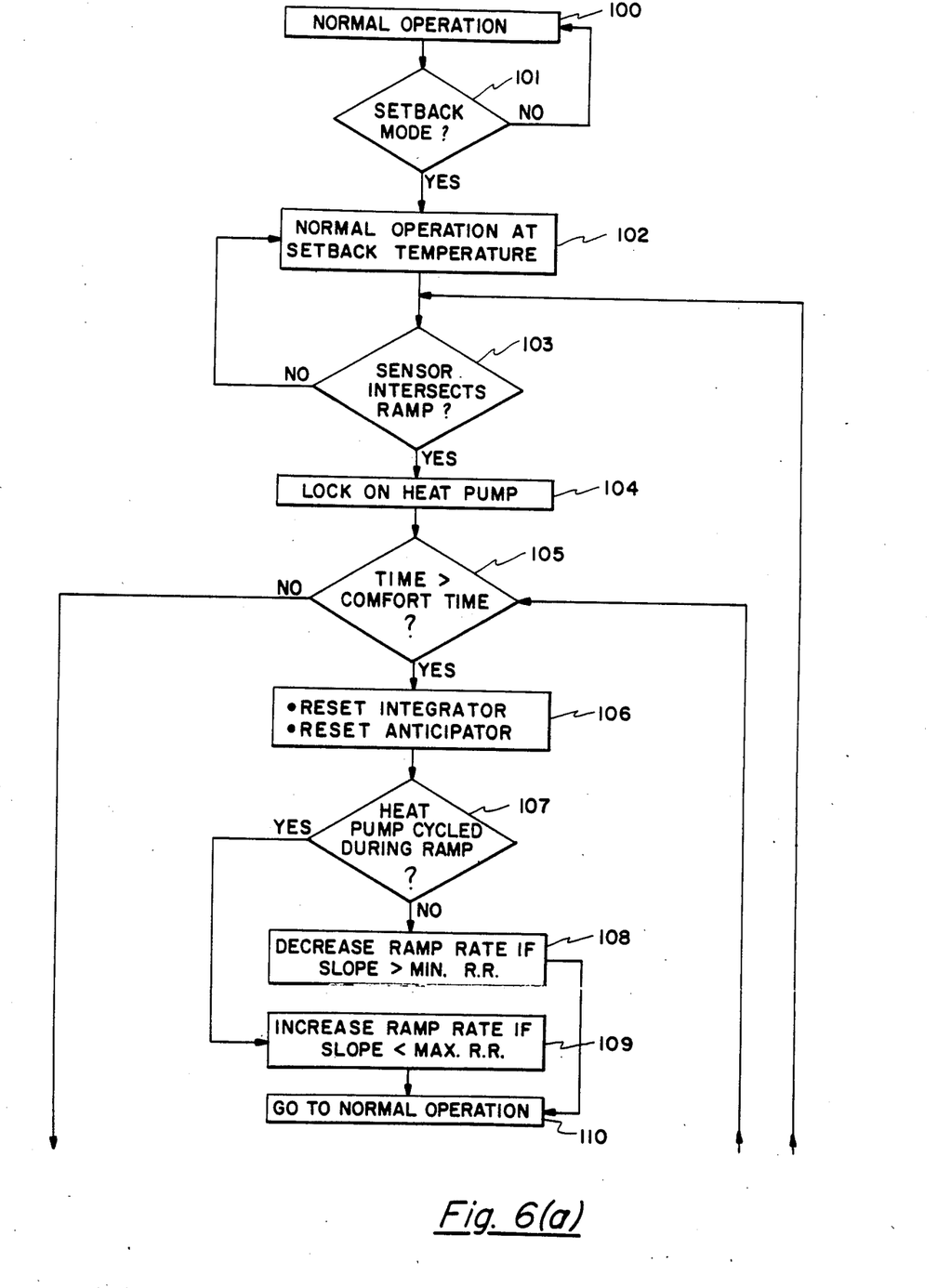
FIGS. 6a and b are a flow chart of the operation of the system.

While the entire operation is believed understandable from FIGS. 1 through 5, a flow chart is provided in FIG. 6a and b for this concept.

Normal operation at the comfort temperature is in effect at 100. An inquiry is then made at 101 as to whether or not the system is switching to a setback mode. If the system is not, normal operation continues at 100. If the system is switching to a setback mode, normal operation at the setback temperature begins at 102. At 103, an inquiry is made as to whether or not the sensor temperature has intersected the ramp. If it has not, the system continues normal operation at the setback temperature at 102; otherwise the heat pump is locked into operation at 104.

At 105, an inquiry is made to see if the actual time is greater than the programmed comfort time. If this is true, the integrator and anticipator values in the thermostat memory are reset at 106, and then an inquiry is made at 107 as to whether or not the heat pump had cycled during the ramp operation. If the heat pump had cycled and the ramp rate is less than the maximum ramp rate value, the ramp rate for that period is increased at 109. If the heat pump did not cycle during the ramp operation and the ramp rate is greater than the minimum ramp rate value, the ramp rate is decreased at 108. After modifying the ramp rate at either box 108 or 109, the system returns to normal operation at the comfort temperature at 110.

Figure 6B:
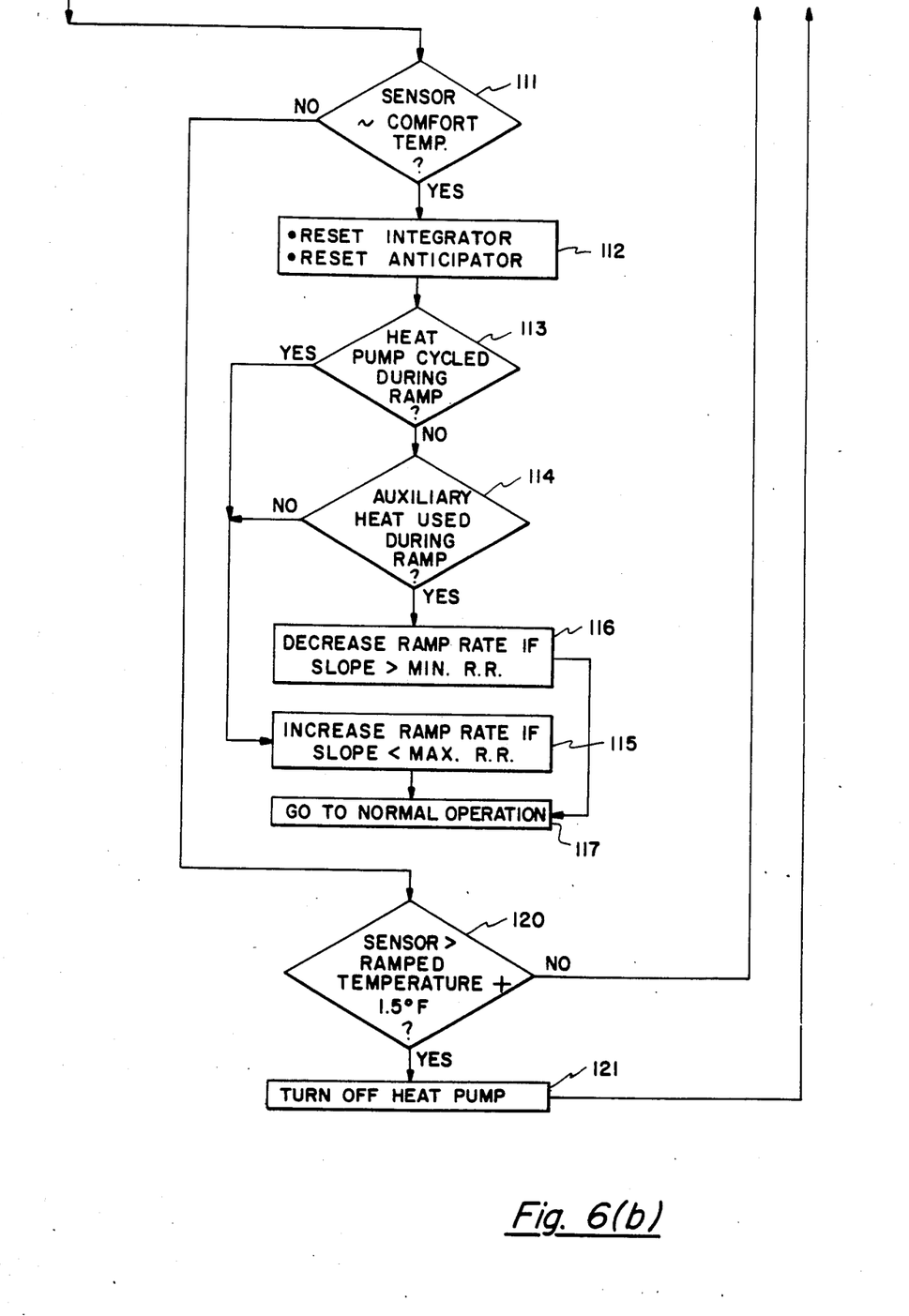

If, at 105, the actual time is not greater than the programmed comfort time, control proceeds to block 111 where an inquiry is made to see if the sensor temperature is within a predetermined value of the comfort temperature. If this is true, the integrator and anticipator values in the thermostat memory are reset at 112, and then an inquiry is made at 113 as to whether or not the heat pump had cycled during the ramp operation. If the heat pump had cycled and the ramp rate is less than the maximum ramp rate value, the ramp rate for that period is increased at 115. If the heat pump did not cycle during the ramp operation, a check is made at 114 as to whether or not the auxiliary heat was used at all during the ramp operation. If it was not used and the ramp rate is less than the maximum ramp rate value, the ramp rate is again increased at 115. If auxiliary heat was used, the ramp rate is decreased if its present value is greater than the minimum ramp rate value, as shown at 116. After modifying the ramp rate at either box 115 or box 116, the system returns to normal operation at the comfort temperature at 117.

If, at 111, the sensor temperature is not within a predetermined value of the comfort temperature, control proceeds to block 120 where an inquiry is made as to whether or not the sensor has overshot the ramp value by 1.5 degrees Fahrenheit. If this is not true, control returns to block 105. If the sensor has overshot the ramp value by 1.5 degrees Fahrenheit, the heat pump is turned off (cycled) and control returns to block 103.

This algorithm will continue to run until either of the inquiries at 105 or 111 are true. When one of these inquiries is true, the appropriate action will be taken (as has been previously described) and the system will return to normal operation at the comfort temperature.

With the flow chart of FIG. 6a and b, a complete detailed understanding of the operation of the present invention is possible. This flow chart supplements the understanding which is developed through the use of the time versus temperature and function graphs of FIGS. 2-5.

A single implementation of the present invention has been disclosed, but it is obvious that other logic routines could be developed to accomplish the novel concept of the present invention. Persons skilled in digital logic could develop other logic diagrams for this same function and the applicants wish to be limited in the scope of their inventions soly by the scope of the appended claims.

The embodiments of the invention in which an exclusive property or right is claimed are defined as follows:

1. A temperature control system for control of a multiplant environmental unit for tempering the atmosphere in an enclosed space in an energy efficient manner, including: a multiplant environmental unit having at least a first output and a second output; said first output being more cost effective to operate than said second output; real time clock operated two stage thermostat means located in said space; said thermostat means including means to enter selected times and temperatures, and further including means to sense an ambient temperature in said space; said thermostat means having a selected comfort setpoint temperature, and further having a selected energy savings setback setpoint temperature to define limits of the operation of said multiplant environmental unit over a temperature control cycle; said thermostat means including microcomputer means having memory means; said memory means storing a time versus temperature curve with said curve selected to utilize said first output, or both outputs simultaneously which causes said atmosphere to change from said energy savings setback setpoint temperature to said comfort setpoint temperature; a first stage of said thermostat means operating said multiplant environmental unit upon said sensor temperature intersecting said operating curve which then locks on said first output; a second stage of said thermostat means operating said second output; said thermostat means ending a recovery and shifting to said selected comfort setpoint temperature upon said sensor temperature reaching a specified value below said setpoint temperature, or upon the expiration of a setback time programmed in said memory means; and said memory means storing a time of said ending recovery and increasing or decreasing a ramprate of said time versus temperature curve for a next temperature control cycle depending on whether said end of recovery time occurred before said setback time.

2. A temperature control system for a multiplant environmental unit as claimed in claim 1 wherein said memory means stores a plurality of time versus temperature curves for use at different periods of time.

3. A temperature conrol system for a multiplant environmental unit as claimed in claim 1 wherein said time versus temperature curve has a minimum ramp rate slope that is enforced by said thermostat means to ensure at least a minimum amount of setback energy savings.

4. A temperature control system for a multiplant environmental unit as claimed in claim 3 wherein said time versus temperature curve has a maximum ramp rate slope that is enforced by said thermostat means to ensure at least a minimum amount of time is available for a recovery from said selected energy savings setback setpoint temperature to said selected comfort setpoint temperature.

5. A temperature control system for a multiplant environmental unit as claimed in claim 4 wherein said memory means stores a plurality of time versus temperature curves for use a different periods of time.

6. A real time clock operated two stage thermostat means for control of a multiplant environmental unit having at least a first output and a second output with said first output being more cost effective to operate than said second output for tempering the atmosphere in an enclosed space in an energy efficient manner, including: said thermostat means located in said space; said thermostat means including means to enter selected times and temperatures, and further including means to sense an ambient temperature in said space; said thermostat means having a selected comfort setpoint temperature, and further having a selected energy savings setback setpoint temperature to define limits of the operation of said multiplant environmental unit over a temperature control cycle; said thermostat means including microcomputer means having memory means; said memory means storing a time versus temperature curve with said curve selected to utilize said first output, or both outputs simultaneously which causes said atmosphere to change from said energy savings setback setpoint temperature to said comfort setpoint temperature; a first stage of said thermostat means operating said multiplant environmental unit upon said sensor temperature intersecting said operating curve which then locks on said first output; a second stage of said thermostat means operating said second output; said thermostat means ending a recovery and shifting to said selected comfort setpoint temperature upon said sensor temperature reaching a specified value below said setpoint temperature, or upon the expiration of a setback time programmed in said memory means; and said memory means storing a time of said end of recovery and increasing or decreasing a ramprate of said time versus temperature curve for a next temperature control cycle depending on whether said end of recovery time occurred before said setback time.

7. A temperature control system for a multiplant environmental unit as claimed in claim 6 wherein said memory means stores a plurality of time versus temperature curves for use at different periods of time.

8. A temperature conrol system for a multiplant environmental unit as claimed in claim 6 wherein said time versus temperature curve has a minimum ramp rate slope that is enforced by said thermostat means to ensure at least a minimum amount of setback energy savings.

9. A temperature control system for a multiplant environmental unit as claimed in claim 8 wherein said time versus temperature curve has a maximum ramp rate slope that is enforced by said thermostat means to ensure at least a minimum amount of time is available for a recovery from said selected energy savings setback setpoint temperature to said selected comfort setpoint temperature.

10. A temperature control system for a multiplant environmental unit as claimed in claim 9 wherein said memory means stores a plurality of time versus temperature curves for use a different periods of time.

* * * * *